United States Patent [19]
Chung

[11] Patent Number: 6,015,251
[45] Date of Patent: Jan. 18, 2000

[54] SECURE THREADED FASTENER

[76] Inventor: Boo Kang Chung, Junghoa-Dong 286-37, Junglang-gu, Seoul, Rep. of Korea

[21] Appl. No.: 09/026,028

[22] Filed: Feb. 19, 1998

[51] Int. Cl.[7] .............................. F16B 37/12; F16B 35/02
[52] U.S. Cl. ......................... 411/252; 411/262; 411/383; 411/412
[58] Field of Search .................................. 411/250, 251, 411/252, 262, 383, 412, 413

[56] References Cited

U.S. PATENT DOCUMENTS

| | | | |
|---|---|---|---|
| 900,589 | 10/1908 | Ratcliffe | 411/262 |
| 1,267,656 | 5/1918 | Goserud | 411/252 |
| 1,630,958 | 5/1927 | Mauch | 411/252 |
| 2,233,889 | 3/1941 | Hood | 411/251 |
| 2,562,621 | 7/1951 | Larson | 411/252 |
| 5,449,259 | 9/1995 | Clohessey | 411/252 X |

*Primary Examiner*—Neill Wilson
*Attorney, Agent, or Firm*—Skjerven, Morrill, MacPherson, Franklin & Friel LLP; Alan H. MacPherson; Hugh H. Matsubayashi

[57] ABSTRACT

A secure threaded fastener, prevented from unexpectedly coming loose, is described. The fastener or a nut or bolt has a coil spring capable of stopping the fastener when the fastener may be unexpectedly rotated in a loosening direction due to an outside force. The coil spring is received in a smooth section of the fastener with one end of the spring being fixed and the other end being movable and so the spring's diameter is changeable in accordance with a rotating direction of the fastener. When the fastener is rotated in a tightening direction, the spring allows the fastener to be smoothly tightened. However, when the fastener is unexpectedly rotated in a loosening direction, the spring prevents the fastener from unexpectedly coming loose.

5 Claims, 13 Drawing Sheets

SECURE THREADED FASTENER

BACKGROUND OF THE INVENTION

1. Field of the Invention

The present invention relates, in general, to internally or externally threaded fasteners or nuts or bolts used for fastening or joining two or more separate parts of an article or structure and, more particularly, to a secure threaded fastener provided with a coil spring capable of preventing the fastener from unexpectedly coming loose.

2. Description of the Prior Art

Internally or externally threaded fasteners: nuts or bolts are well-known fasteners, which have been widely used for joining two or more separate parts of an article or structure. Therefore, the soul of such threaded fasteners is their tightness, which joins separate parts without allowing the fasteners to be unexpectedly loosened.

However, typical threaded fasteners may lose their tightness due to vibrations, impacts or temperature change, thus being unexpectedly loosened and failing to securely join separated parts.

In an effort to prevent such an unexpected looseness of threaded fasteners, several types of devices for improving the tightness of the fasteners are proposed and widely used.

Washers, fluted nuts, split pins and snap rings are examples of such tightness improving devices. Typical washers used are spring washers, plane washers and washer based nuts. A typical fluted nut is used with a split pin and is provided with a diametrical groove or hole for the split pin at the top portion. Meanwhile, a typical snap ring is elastically fitted over the shank of a bolt at a position around a nut tightened to the bolt, thus stopping the nut and preventing the nut from being unexpectedly loosened.

However, such typical tightness improving devices are problematic in that they fail to effectively improve the tightness of threaded fasteners as will be described hereinbelow.

That is, typical washers are designed to reduce impact vibrations applied to threaded fasteners. Therefore, such washers fail to completely prevent unexpected looseness of the fasteners and only prevent a rapid looseness.

On the other hand, the fluted nuts with split pins are designed to be prevented from being removed from bolts. However, such fluted nuts are not designed to basically prevent looseness of nuts, thus failing to keep the tightness of nuts or bolts.

In order to overcome the problems experienced in typical washers or washer based nuts, a toothed washer based nut is proposed. Such a toothed washer based nut has a somewhat improved tightness due to a toothed surface of the washer. However, such an improvement in the tightness provided by the toothed washer is not enough to keep the desired tightness of threaded fasteners, thus failing to completely prevent the fasteners from being unexpectedly loosened.

As described above, the soul of threaded fasteners is their tightness resisting against unexpected looseness. Particularly, when threaded fasteners, used for joining separated parts of normally vibrated articles or structures such as machinery, automobiles or airplanes, do not effectively keep their tightness, the separated parts joined by the fasteners may be unexpectedly loosened and moved relative to each other. In such a case, the loosened and moved parts may cause an operational error and fail to perform their desired function, resulting in a breakdown or safety hazard.

SUMMARY OF THE INVENTION

Accordingly, the present invention has been made keeping in mind the above problems occurring in the prior art, and an object of the present invention is to provide a secure threaded fastener, which is provided with a coil spring capable of stopping the fastener when the fastener may be unexpectedly rotated in a loosening direction due to an outside force, thus preventing the fastener from unexpectedly coming loose.

In an embodiment, the invention is adapted to an internally threaded fastener or a nut. In the above nut, a coil spring is received in a smooth section of the internally threaded hole with one end of the spring being fixed and the other end being movable. When the nut is rotated in a tightening direction, the spring's diameter is enlarged and allows the nut to be smoothly tightened to a bolt. However, when the nut is unexpectedly rotated in a loosening direction, the spring's diameter is reduced, causing the spring to compress the bolt and preventing the nut from unexpectedly coming loose.

That is, when the nut is rotated in the tightening direction, the spring slides in a direction from the movable end to the fixed end, thus having an enlarged diameter allowing the bolt to be free from the spring and to be rotatable relative to the nut.

However, when the nut is impacted or vibrated and may be unexpectedly rotated in a loosening direction, the spring slides in an opposite direction, thus having a reduced diameter. The spring thus compresses the bolt and prevents the nut from unexpectedly coming loose. In such a case, the compressing force of the spring for the bolt is in proportion to an external force acting on the nut, thus almost completely preventing the nut from being unexpectedly loosened.

In another embodiment, the invention is adapted to an externally threaded fastener or a bolt.

In the above bolt, a coil spring is fitted over a smooth section of the externally threaded shank of the bolt with one end of the spring being fixed and the other end being movable. The coil spring, used with the bolt, almost completely prevents the bolt from unexpectedly coming loose in the same manner as described for the nut.

As described above, the coil spring of the present invention is adapted to a nut or bolt, thus preventing the nut or bolt from being unexpectedly loosened and allowing the nut or bolt to securely join two or more separate parts of an article or structure.

In accordance with a further embodiment, a threaded fastener with the coil spring is provided with a means for selectively changing the fastener between a secured position and a loosenable position. The above means may be automatically operated in accordance with a rotating direction of the fastener, thus automatically changing the position of the fastener between the secured and loosenable positions. That is, when the fastener is rotated in a loosening direction by a user, the position of the fastener is automatically changed from the secured position into the loosenable position, thus allowing the user to easily loosen the fastener.

BRIEF DESCRIPTION OF THE DRAWINGS

The above and other objects, features and other advantages of the present invention will be more clearly understood from the following detailed description taken in conjunction with the accompanying drawings, in which:

FIGS. 14a and 14b are sectional views showing the operational effect of the secure nut of FIG. 12, in which:

FIGS. 21a and 21b are plan sectional views showing the operational effect of a coil spring provided in the secure bolt of FIG. 18, in which:

DESCRIPTION OF THE PREFERRED EMBODIMENTS

The present invention may be selectively adapted to internally or externally threaded fasteners or nuts or bolts as will be described hereinbelow.

Figure 1:
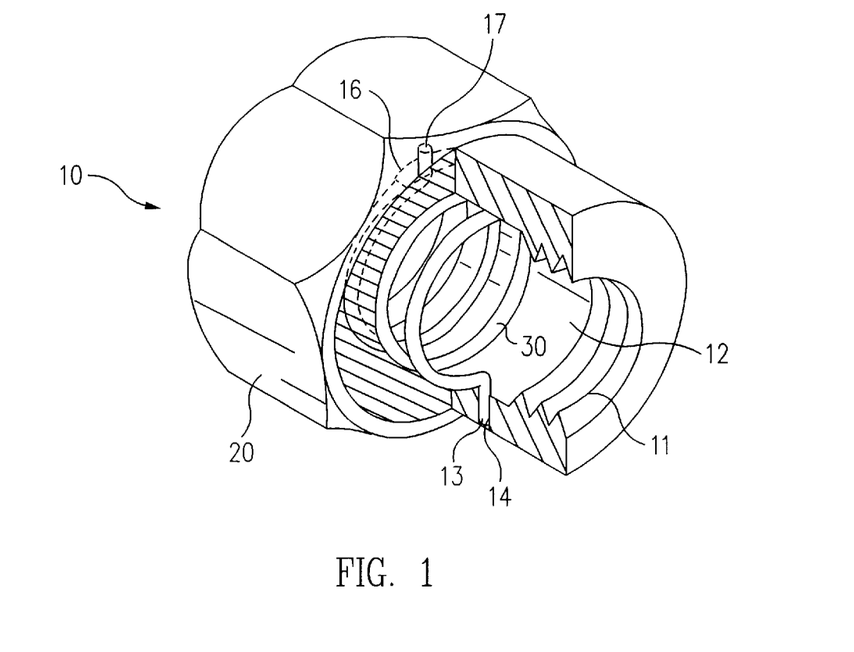
FIG. 1 is a partially broken perspective view of a secure nut in accordance with the primary embodiment of the present invention.
Figure 2:
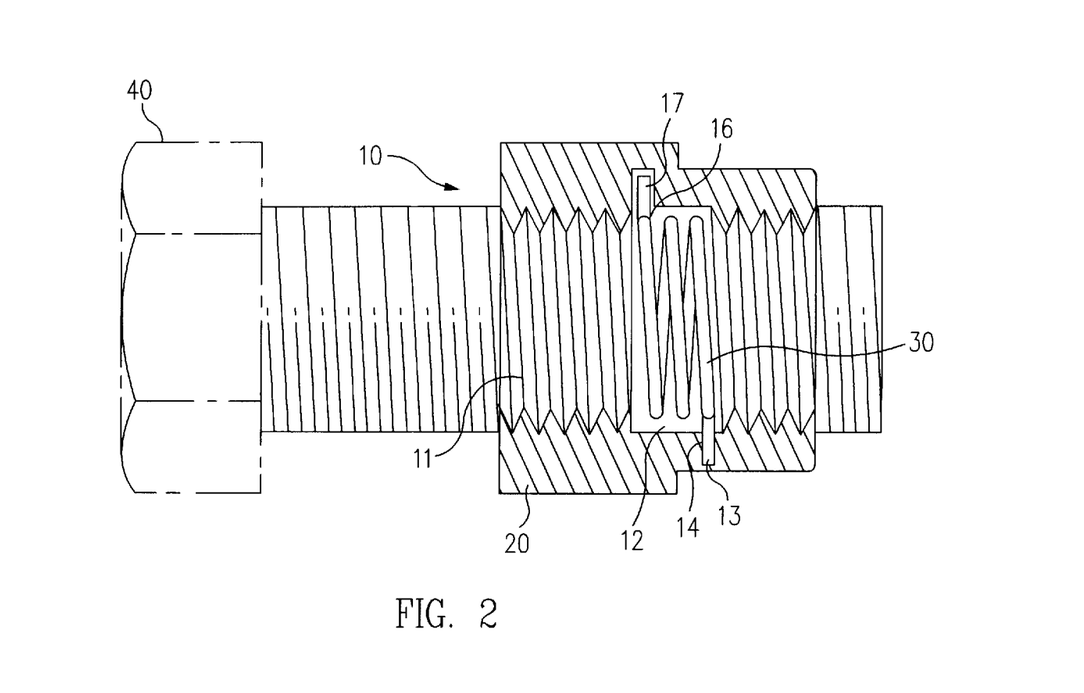
FIG. 2 is a front sectional view of the secure nut of FIG. 1.
Figure 3:
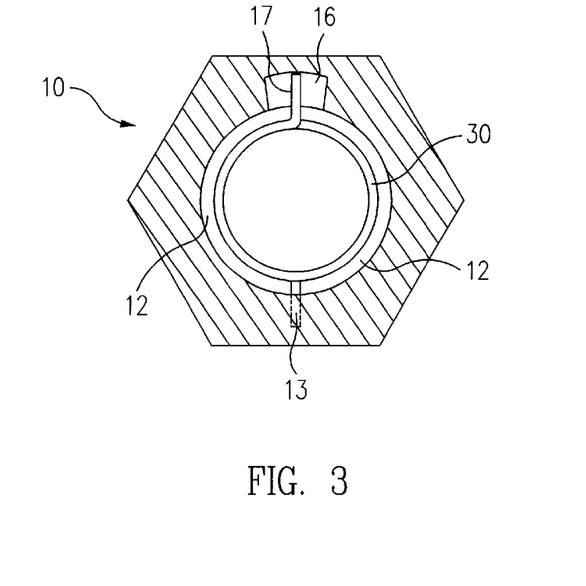
FIG. 3 is a side sectional view of the secure nut of FIG. 1.
Figure 4:
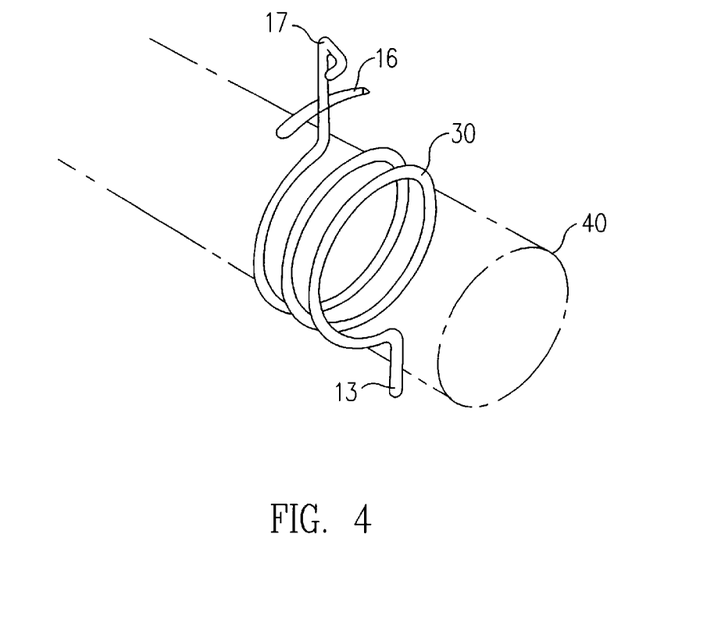
FIG. 4 is a perspective view of a coil spring provided in the secure nut of FIG. 1.
Figure 5:
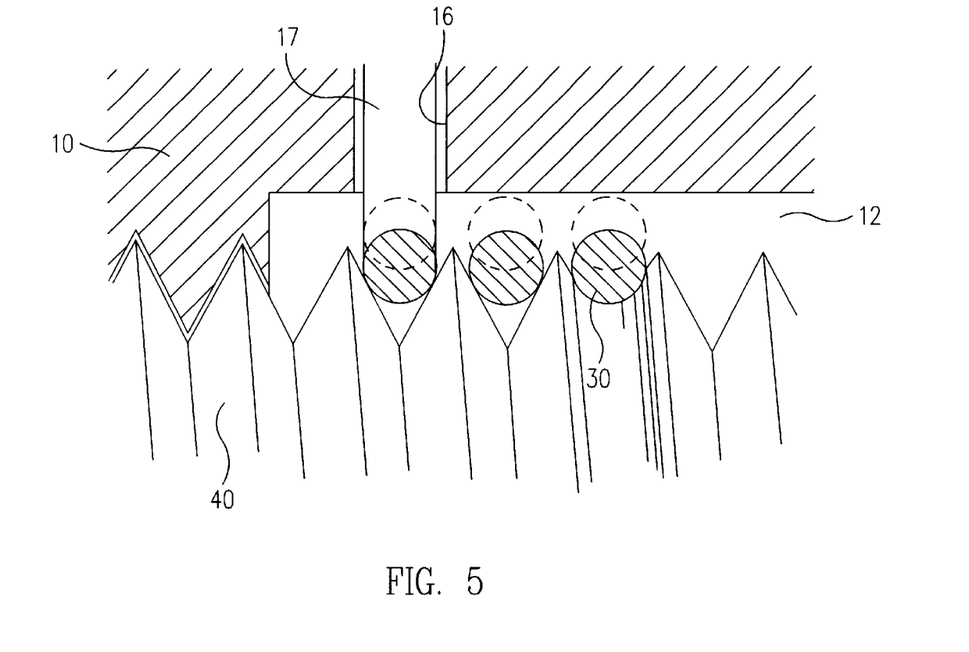
FIG. 5 is a sectional view showing the operational effect of the secure nut of FIG. 1.

FIG. 1 is a partially broken perspective view of a secure nut in accordance with the primary embodiment of the present invention. FIG. 2 is a front sectional view of the above secure nut. FIG. 3 is a side sectional view of the above secure nut. FIG. 4 is a perspective view of a coil spring 30 provided in the above secure nut. FIG. 5 is a sectional view showing the operational effect of the above secure nut.

As shown in the drawing, the nut 10 according to the primary embodiment of this invention has an internal thread 11 within the body 20 in the same manner as a conventional nut.

A smooth section 12, without having any internal thread, is formed at the middle portion of the internally threaded hole of the body 20, thus receiving a coil spring 30 which has at least two turns. It is preferable to make the inner diameter of the smooth section 12 equal to or larger than the major diameter of the nut 10. The coil spring 30 is radially outwardly bent at both ends. One end of the spring 30 is fixedly caught by a radial fixing slot 14 of the body 20, thus forming a fixed end 13 of the spring 30. The other end of the spring 30 is movably received in a guide slit 16 of the body 20, thus forming a movable end 17 of the spring 30.

The operational effect of the above nut 10 will be described hereinbelow.

The nut 10 is tightened to the externally threaded shank of a conventional bolt 40 through a conventional manner with the internal thread 11 of the nut 10 engaging with the external thread of the bolt 40.

When the nut 10 is tightened to the bolt 40 as described above, the coil spring 30 of the nut 10, which engages with the external thread of the bolt 40, slides over the bolt 40. In such a case, the sliding direction of the spring 30 is opposite to a moving direction of the nut 10 and so the diameter of the spring 30 is enlarged, allowing the spring 30 to be free from the bolt 40.

The end 17 of the spring 30 is movable relative to the nut 10, while the end 13 is fixed to the nut 10 as shown in FIGS. 1 to 5.

Due to the movable and fixed ends 17 and 13, the coil spring 30 comes into frictional contact with the external thread of the bolt 40 and may slide in a direction from the movable end 17 to the fixed end 13 when the nut 10 is rotated in a tightening direction. However, since the end 13 of the spring 30 is fixed to the nut 10, such a sliding motion of the spring 30 results in enlarging the diameter of the spring 30 and forms a space for allowing the bolt 40 to be rotatable. Therefore, the nut 10 is freely, easily and fully tightened to the bolt 40 without interference by the spring 30.

When the nut 10, tightened to the bolt 40, is vibrated or impacted, the nut 10 may be unexpectedly rotated in a loosening direction. However, such a looseness of the nut 10 is effectively prevented by the spring 30. That is, in such a case, the coil spring 30 is brought into frictional contact with the external thread of the bolt 40 and is pushed in a direction from the fixed end 13 to the movable end 17. However, since the spring 30 is fixed to the nut 10 at the fixed end 13, such a movement of the movable end 17 results in a reduction of the diameter of the spring 30.

Therefore, the spring 30 with the reduced diameter compresses the bolt 40 and prevents the nut 10 from being unexpectedly loosened from the bolt 40 by vibrations or impacts. The compressing force of the spring 30 for the bolt 40 is in proportion to an external force acting on the nut 10, thus almost completely preventing the nut 10 from being unexpectedly loosened. The nut 10 according to the primary embodiment of this invention may be more preferably used for fastening separated parts which are not necessary to be loosened once they are fastened by nuts and bolts.

Figure 6:
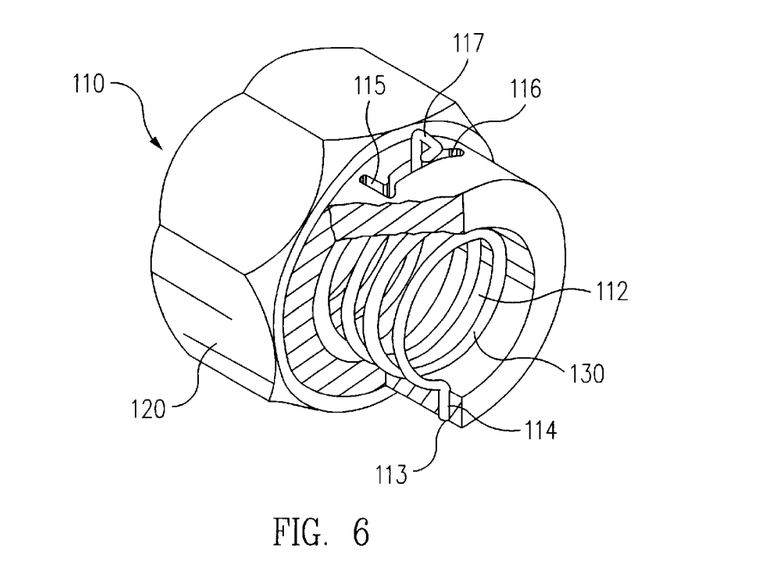
FIG. 6 is a partially broken perspective view of a secure nut in accordance with the second embodiment of the present invention.
Figure 7:
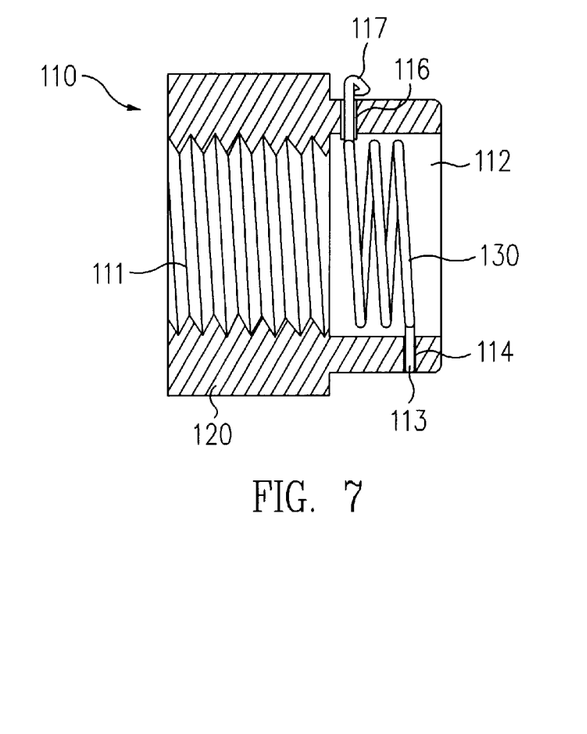
FIG. 7 is a front sectional view of the secure nut of FIG. 6.
Figure 8:
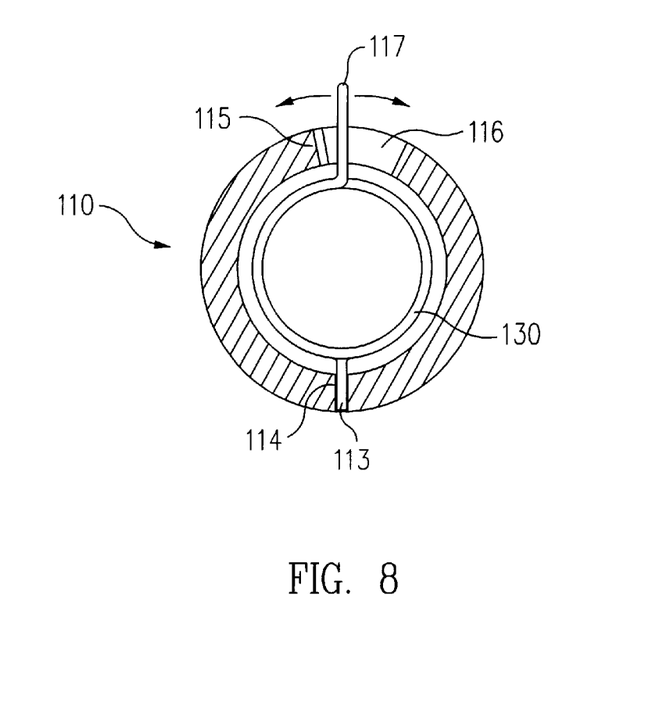
FIG. 8 is a side sectional view of the secure nut of FIG. 6.

FIG. 6 is a partially broken perspective view of a secure nut in accordance with the second embodiment of the present invention. FIGS. 7 and 8 are sectional views showing the operational effect of the secure nut of FIG. 6. In the second embodiment, the general shape of the nut 110 remains the same as that described for the primary embodiment, but the nut 110 of the second embodiment has a hook slit 115 at the guide slit 116 of the nut's body 120, thus selectively hooking or releasing the movable end 117 of the coil spring 130 in the guide slit 116 and allowing the position of the movable end 117 to be selectively changed between a fixed position or a movable position.

In the second embodiment, the coil spring 130 is received in the smooth section 112 of the nut's body 120, with the fixed end 113 of the spring 130 being caught by the radial fixing slot 114 of the body 120 and the movable end 117 of the spring 130 being caught by the guide slit 116 of the body 120. The hook slit 115 is formed at one end of the guide slit 116 so as to communicate with the guide slit 116, thus selectively hooking and stopping the movable end 117 of the spring 130.

The operational effect of the above nut 110 will be described hereinbelow.

When the movable end 117 of the spring 130 is not positioned in the hook slit 115 but is positioned in the guide slit 116, the nut 110 is operated in the same manner as that described for the primary embodiment. That is, when the nut 110 is tightened to the externally threaded shank of a bolt, the diameter of the coil spring 130 is enlarged, allowing the nut 110 to be free from the bolt and to be smoothly tightened to the bolt without having any interference between the spring 140 and the bolt. On the other hand, when the nut 110 is impacted or vibrated and may be rotated in a loosening direction, the diameter of the spring 130 is reduced and so the spring 130 compresses the bolt, thus preventing the nut 110 from unexpectedly coming loose.

When it is necessary to loosen the nut 110, the movable part 117 of the spring 130 is moved from the guide slit 116 into the hook slit 115 prior to rotating the nut 110, thus fixing both ends 113 and 117 of the spring 130 to the nut 110. In such a case, the number of turns of the spring 130 is reduced when the nut 110 is rotated in a loosening direction and so the spring's diameter is enlarged.

Therefore, the spring's diameter becomes larger than the bolt's diameter and makes the bolt free from the spring 130, thus allowing the nut 110 to be smoothly rotatable in a loosening direction.

Figure 9:
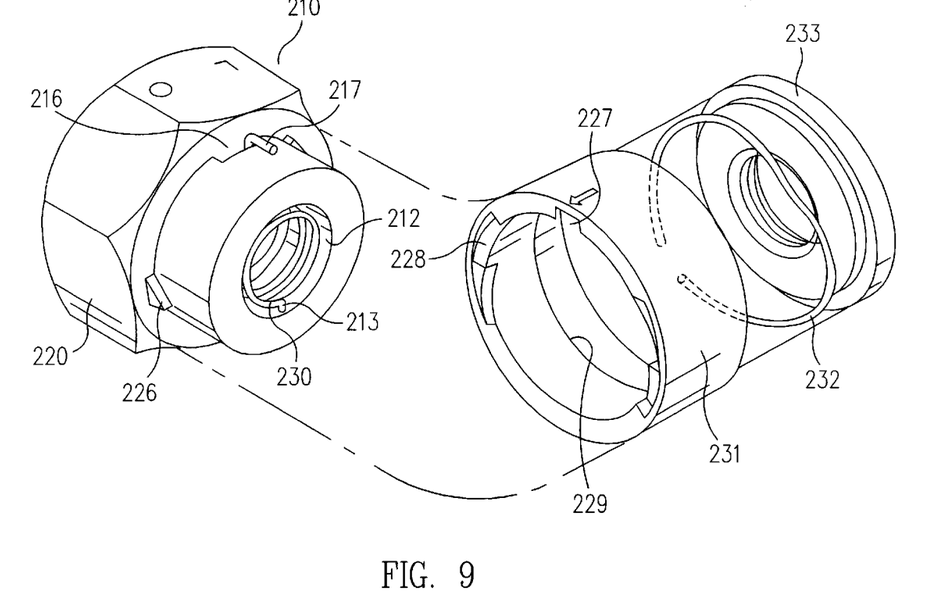
FIG. 9 is an exploded perspective view of a secure nut in accordance with the third embodiment of the present invention.
Figure 10:
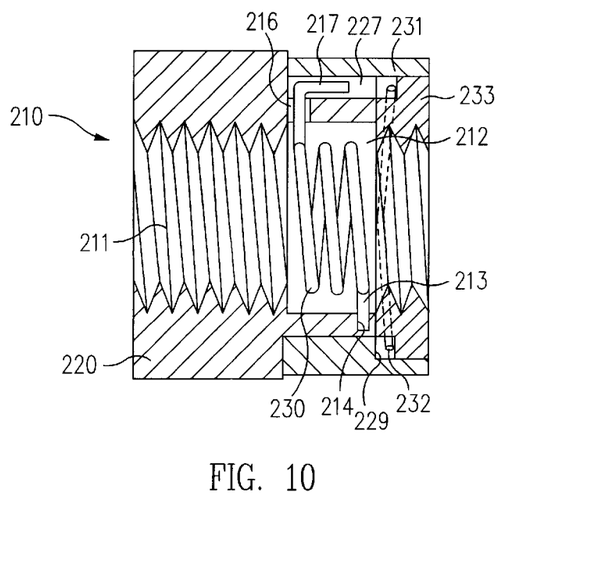
FIG. 10 is a sectional view of the secure nut of FIG. 9 with the parts being assembled into a single body.
Figure 11:
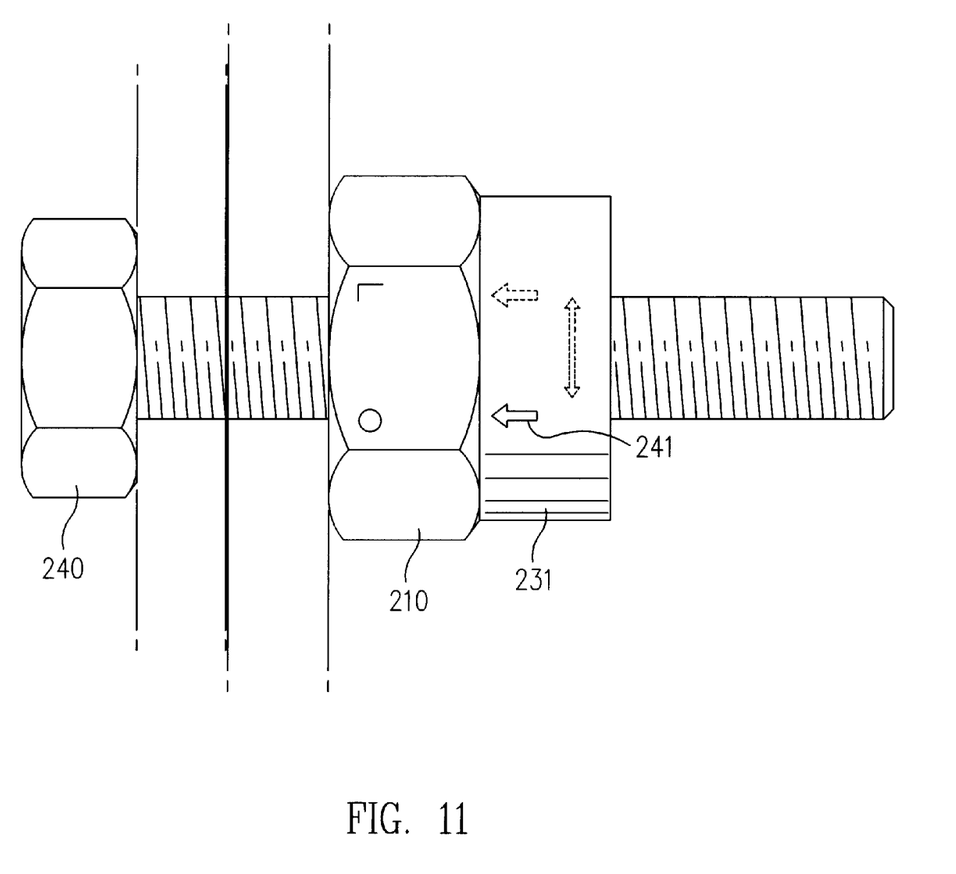
FIG. 11 is a plan view of the secure nut of FIG. 9 tightened to a conventional bolt and shows the operational effect of the nut.

FIG. 9 is an exploded perspective view of a secure nut in accordance with the third embodiment of the present invention. FIG. 10 is a sectional view of the secure nut of FIG. 9 with the parts being assembled into a single body. FIG. 11 is a plan view of the secure nut of FIG. 9 tightened to a bolt and shows the operational effect of the nut. In the third embodiment, the nut 210 has a stop protrusion 226 at the body 220 and engages with a movable hub 231 used for selectively changing the nut 210 between a secured position or a loosenable position relative to a bolt.

As shown in FIGS. 9 to 11, the coil spring 230 is received in the smooth section 212 of the nut's body 220, with the fixed end 213 of the spring 230 being caught by the radial fixing slot 214 of the body 220 and the movable end 217 of the spring 230 radially passing through the guide slit 216 of the body 220. The nut's body 220 is provided with a stop protrusion 226 at the outside surface, while the hub 231, fitted over the nut's body 220, is provided with two types of grooves: a stop groove 228 for the stop protrusion 226 of the body 220 and an actuating groove 227 for the movable end 217 of the spring 230. The hub 231 is interiorly stepped at the outside edge, thus having a bushing part 229. In order to assemble the above hub 231 with the nut's body 220, the hub 231 is fitted over the body 220 prior to fitting an end ring 233 into the bushing part 229 with a torsion spring 232 being interposed between the hub 231 and the end ring 233. The above nut 210 is selectively changed between a secured position or a loosenable position relative to a bolt by moving the hub 231.

In the above nut 210, the fixed end 213 of the spring 230 is fixed to the radial fixing slot 214 of the body 220, while the movable end 217 is caught by the actuating groove 227 of the hub 231 after passing through the guide slit 216 of the nut's body 220. Therefore, it is possible to control the number of turns of the coil spring 230 by rotating the hub 231 in either direction, thus enlarging or reducing the diameter of the spring 230 and selectively changing the nut 210 between a secured position or a loosenable position relative to a bolt.

When the nut 220 engages with the hub 231, the stop protrusion 226 of the body 220 is seated in the stop groove 228 of the hub 231.

In addition, the end ring 233 is fitted into the bushing part 229 of the hub 231 with the torsion spring 232 interposed between the hub 231 and the end ring 233, thus allowing the stop groove 228 to selectively disengage from the stop protrusion 226.

That is, the torsion spring 232 elastically pushes the hub 231, thus causing the stop groove 228 of the hub 231 to be brought into engagement with the stop protrusion 226.

When it is necessary to rotate the hub 231 so as to tighten or loosen the nut 210 relative to a bolt, the hub 231 is pushed to a direction, thus being elastically moved by the torsion spring 232. Therefore, the stop groove 228 of the hub 231 is released from the stop protrusion 226 and allows the hub 231 to be rotatable relative to the nut's body 220. The hub 231 is, thereafter, rotated to align an arrow mark 241 of the hub 231 to an "ON" or "OFF" mark described on the body 220. It is thus possible to change the movable end 217 of the spring 230 between a fixed position or a movable position.

When the hub 231 is rotated as described above, the nut 210 is freely rotatable in a tightening or loosening direction.

When the nut 210 is rotated in a tightening or loosening direction, the coil spring 230 is operated in the same manner as that described for the primary and second embodiments.

In the third embodiment, the end ring 233 is fitted into the hub 231. However, it should be understood that the ring 233 may be integrated with the nut's body 220 through a rivetting or welding process without affecting the functioning of the invention.

In the primary to third embodiments, the invention is adapted to a hexagonal nut. However, the invention may be adapted to clamp nuts different from such hexagonal nuts without affecting the functioning of this invention.

Figure 12:
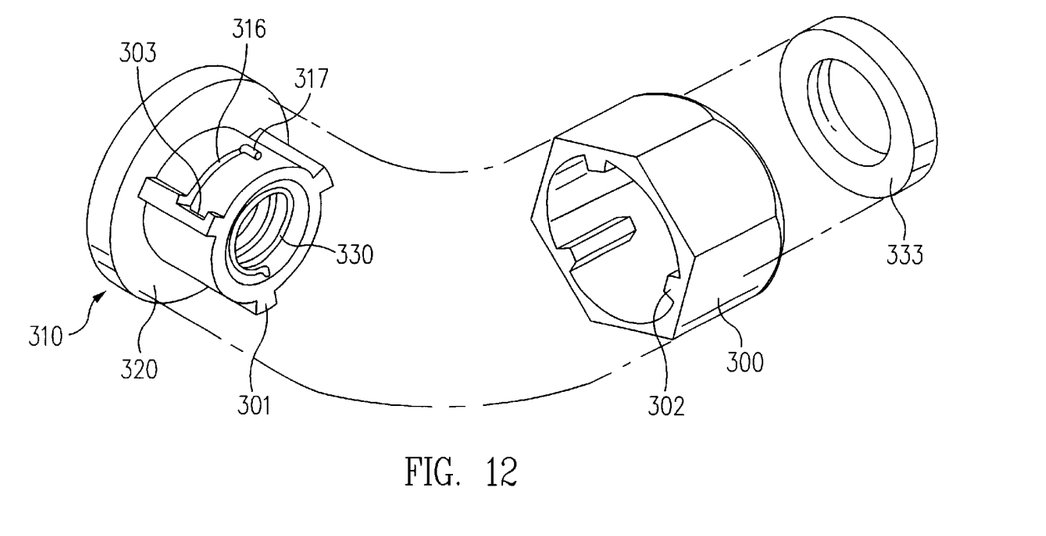
FIG. 12 is an exploded perspective view of a secure nut with a structure for automatically changing the nut between a secured position or a loosenable position relative to a bolt in accordance with the fourth embodiment of the present invention.
Figure 13:
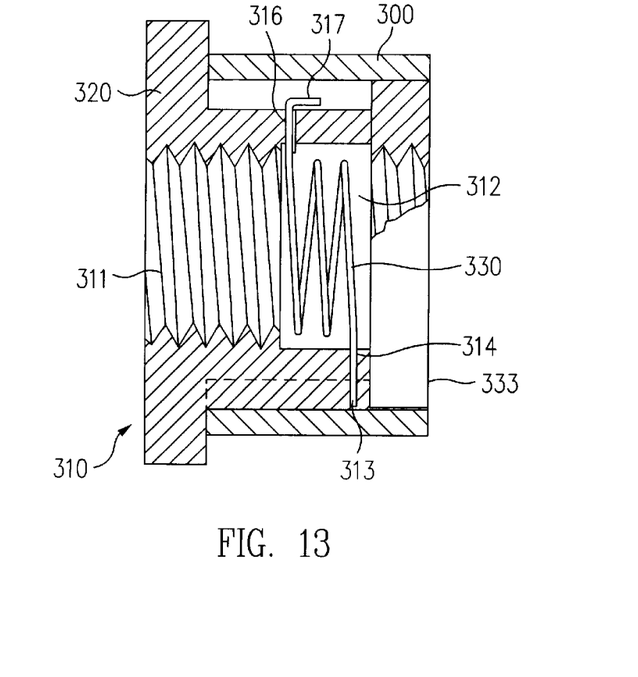
FIG. 13 is a sectional view of the secure nut of FIG. 12 with the parts being assembled into a single body.
Figure 14A:
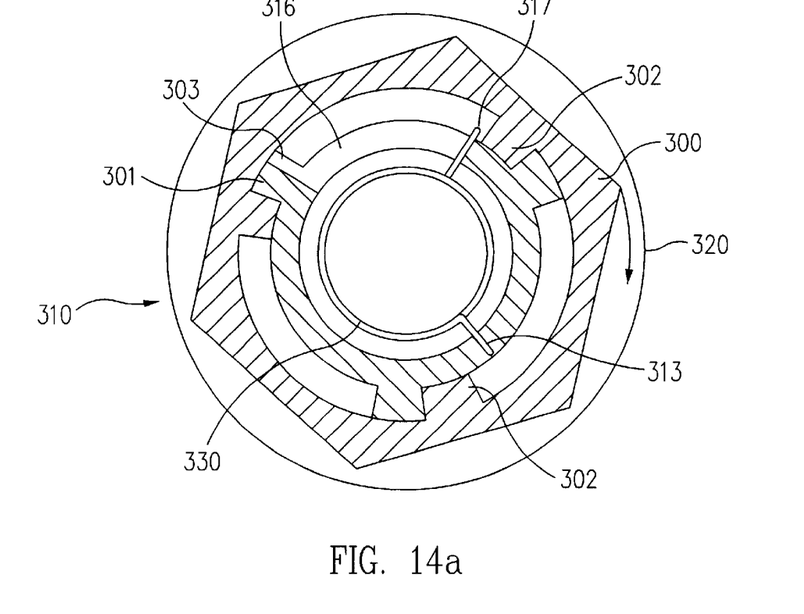
FIG. 14a shows the nut in a secured position.
Figure 14B:
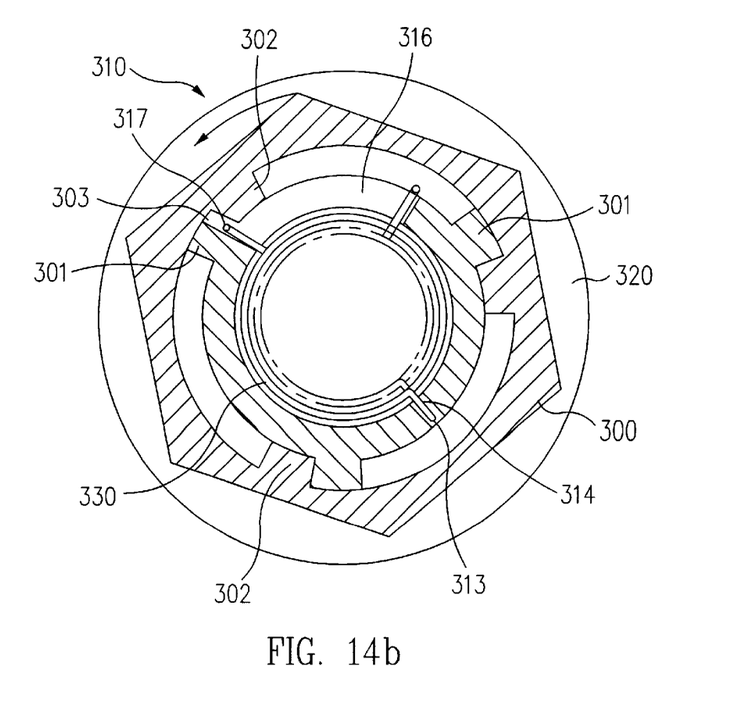
FIG. 14b shows the nut automatically changed into a loosenable position.

FIG. 12 is an exploded perspective view of a secure nut in accordance with the fourth embodiment of the present invention. FIGS. 13, 14a and 14b are sectional views showing the operational effect of the secure nut of FIG. 12. In the fourth embodiment, the nut is provided with a plurality of splines at the outside surface of the body and engages with an actuating cap, thus being automatically changed between a secured position and a loosenable position when the nut is rotated in a tightening or loosening direction.

That is, the nut's body 320 has an internal thread 311 with a smooth section 312, thus receiving a coil spring 330 with the fixed end 313 of the spring 330 being caught by the radial fixing slot 314 of the body 320 and the movable end 317 of the spring 330 radially passing through the guide slit 316 of the body 320.

The actuating cap 300, with a plurality of internal splines 302, is fitted over the nut's body 320 having a plurality of external splines 301 prior to fitting an end ring 333 into the outside end of the cap 300. In the nut's body 320, one spline 301, positioned approximate to the guide slit 316, is longitudinally notched, thus having a groove 303 for the movable end 317 of the spring 330.

In order to tighten the nut 310 to a bolt, the actuating cap 300 is rotated in a tightening direction by a tool. In such a case, the external splines 301 of the body 320 are biased by the internal splines 302 of the cap 300, thus rotating the nut 310 around the bolt in the tightening direction.

That is, when the actuating cap 300 is rotated in a direction as shown by the arrow of FIG. 14a, the internal splines 302 of the cap 300 push the external splines 301 of the body 320 and rotate the body 320, thus tightening the nut 310 to the bolt.

When it is necessary to loosen the nut 310 from the bolt, the actuating cap 300 is rotated in opposite direction as shown by the arrow of FIG. 14b. In such a case, the internal splines 302 of the cap 300 move the movable end 317 of the spring 330 in the same direction prior to being brought into contact with the external splines 301 of the body 320.

The diameter of the spring 330 is thus enlarged in the same manner as described for the primary embodiment, thereby allowing the nut 310 to be rotatable in a loosening direction. The internal splines 302 are, thereafter, brought into contact with the external splines 301 and start to push the splines 301, thus rotating the nut 310 in the loosening direction.

In the nut 310 according to the fourth embodiment, the secured or loosenable position of the nut relative to a bolt is automatically and easily selected in accordance with a rotating direction of the nut. Therefore, the above nuts 310 are more convenient to users.

In the above description, the present invention is adapted to internally threaded fasteners or nuts. However, it should be understood that the invention may be preferably adapted to externally threaded fasteners or bolts as will be described hereinbelow.

In the following embodiments, the coil spring of this invention is used with a bolt, thus preventing the bolt from being unexpectedly loosened.

As well known to those skilled in the art, a bolt may be used with a nut or is used alone, thus fastening or joining two or more separate parts of an article or structure. Therefore, it is necessary to provide a bolt with a means for preventing an unexpected looseness of the bolt.

Figure 15:
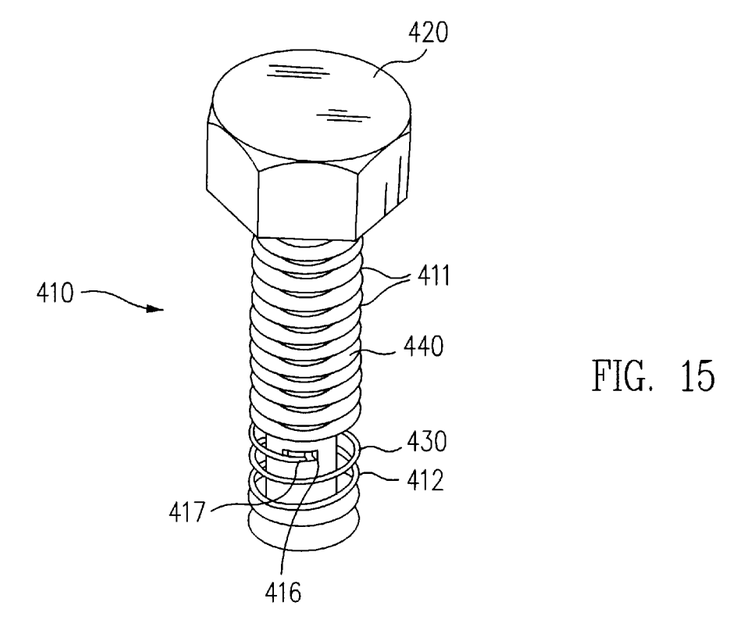
FIG. 15 is a perspective view of a secure bolt in accordance with the fifth embodiment of the present invention.
Figure 16:
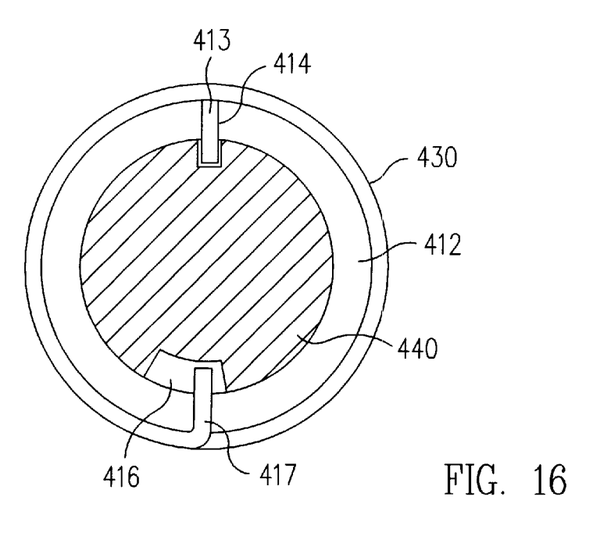
FIG. 16 is a side sectional view of the secure bolt of FIG. 15.
Figure 17:
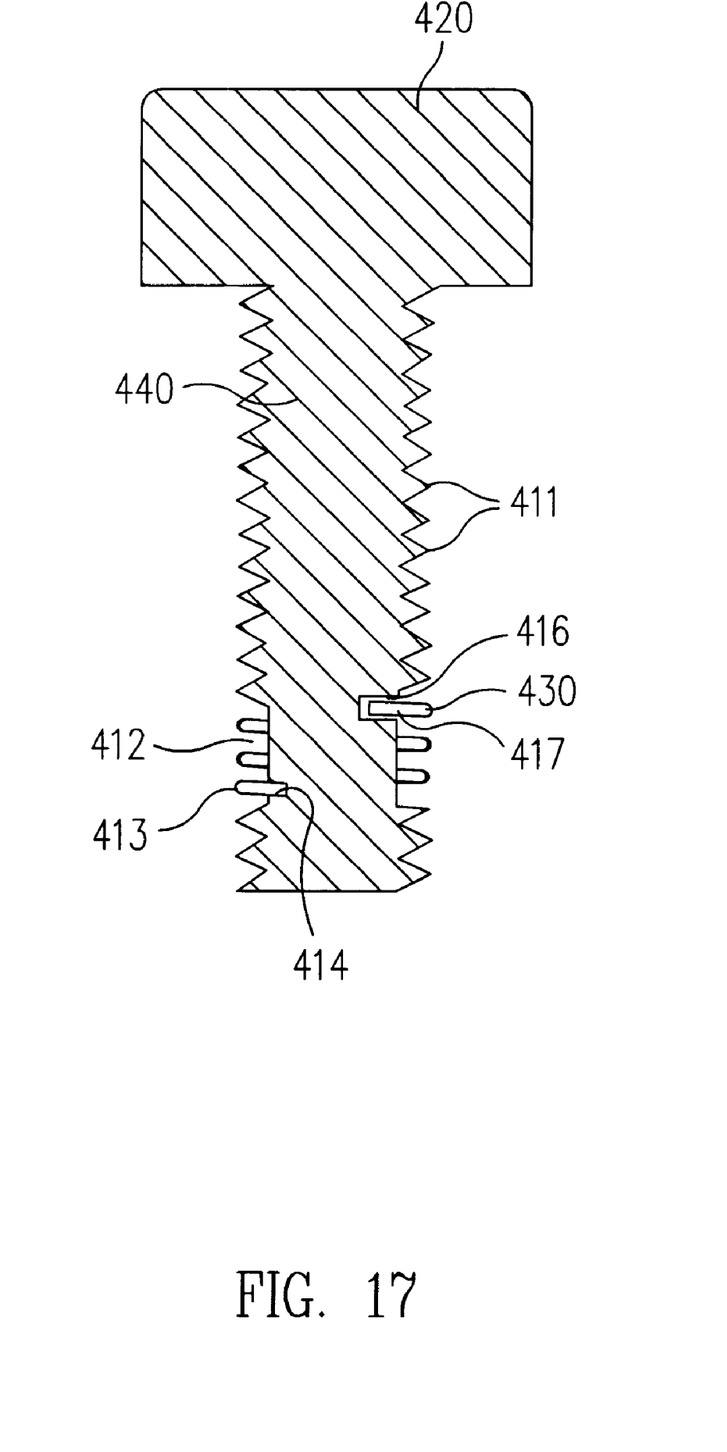
FIG. 17 is a front sectional view of the secure bolt of FIG. 15.

FIG. 15 is a perspective view of a secure bolt in accordance with the fifth embodiment of the present invention. FIG. 16 is a side sectional view of the above secure bolt. FIG. 17 is a front sectional view of the above secure bolt.

As shown in the drawings, the bolt 410 of this invention comprises an externally threaded shank 440 with a flat head 420. A smooth section 412, without having any external thread 411, is formed at the middle portion of the shank 440, thus receiving a coil spring 430. The above smooth section 412 is provided with both a fixing slot 414 and a guide slit 416, while the coil spring 430 is radially inwardly bent at both ends. One end of the spring 430 is fixedly caught by the fixing slot 414, thus forming a fixed end 413 of the spring 430. The other end of the spring 430 is movably received in the guide slit 416 of the shank 440, thus forming a movable end 417 of the spring 430.

The above bolt 410 is screwed into an internally threaded hole of a fixed part after passing through a separate part when it is necessary to join the separate part to the fixed part.

When the bolt 410 is screwed into the fixed part after passing through the separate part as described above, the external thread 411 of the bolt engages with the internal thread of the fixed part. In such a case, the coil spring 430 of the bolt 410 slides over the internally threaded hole of the fixed part. However, since the spring 430 is fixed at the end 413 and is movable at the other end 417, the spring 430 is moved in a direction from the fixed end 413 to the movable end 417. The diameter of the spring 430 is thus reduced and makes the spring 430 free from the internally threaded hole of the fixed part, thus allowing the bolt 410 to be smoothly screwed into the fixed part without having any interference between the internally threaded hole of the fixed part and the coil spring 430.

When the bolt 410, fully screwed into the fixed part, is vibrated or impacted, the bolt 410 may be unexpectedly rotated in a loosening direction. However, such a looseness of the bolt 410 is effectively prevented by the spring 430. That is, in such a case, the coil spring 430 is brought into frictional contact with the internally threaded hole of the fixed part and causes the movable end 417 of the spring 430 to be moved in the guide slit 416. Therefore, the spring 430 slides in a direction from the movable end 417 to the fixed end 413 and so the diameter of the spring 430 is enlarged.

Due to the enlarged diameter of the spring 430, the spring 430 comes into frictional contact with the internally threaded hole of the fixed part and prevents any rotation of the bolt 410 in the internally threaded hole. The bolt 410 is thus completely prevented from unexpectedly coming loose.

Such a bolt 410, with the coil spring 430 preventing the bolt 410 from being unexpectedly loosened, is most preferably used for joining separate parts of a bridge structure or machine.

Figure 18:
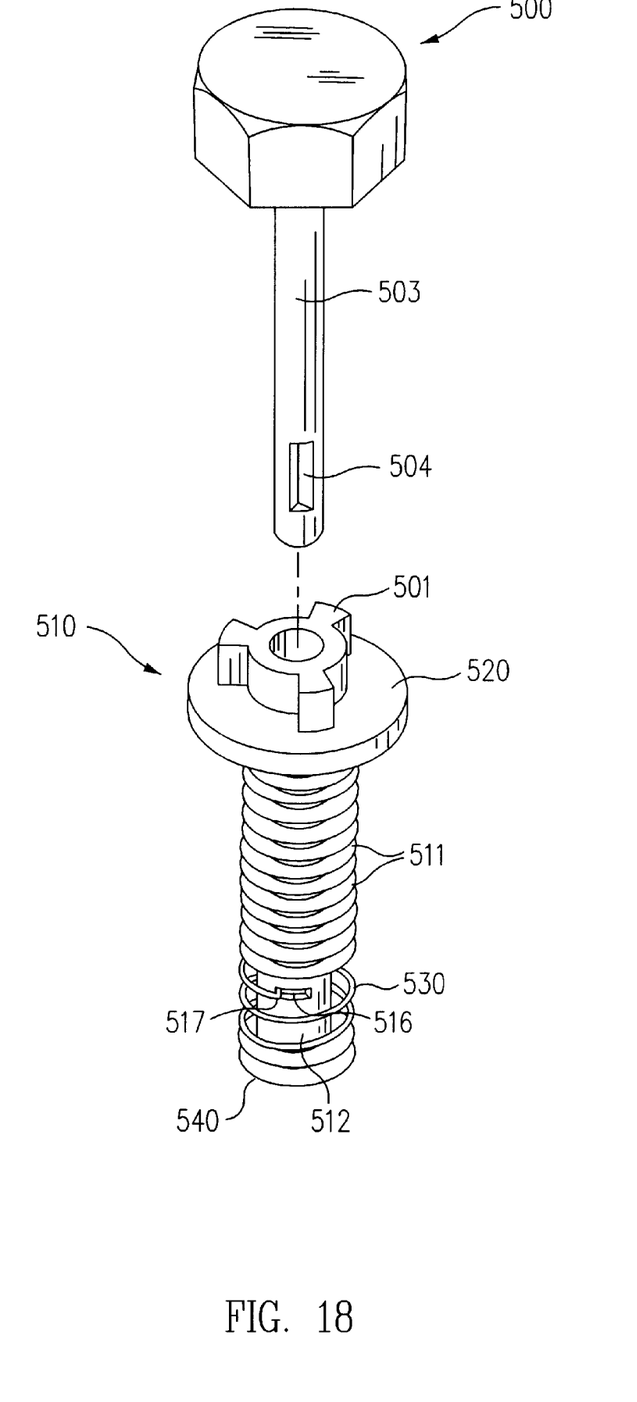
FIG. 18 is an exploded perspective view of a secure bolt in accordance with the sixth embodiment of the present invention.
Figure 19:
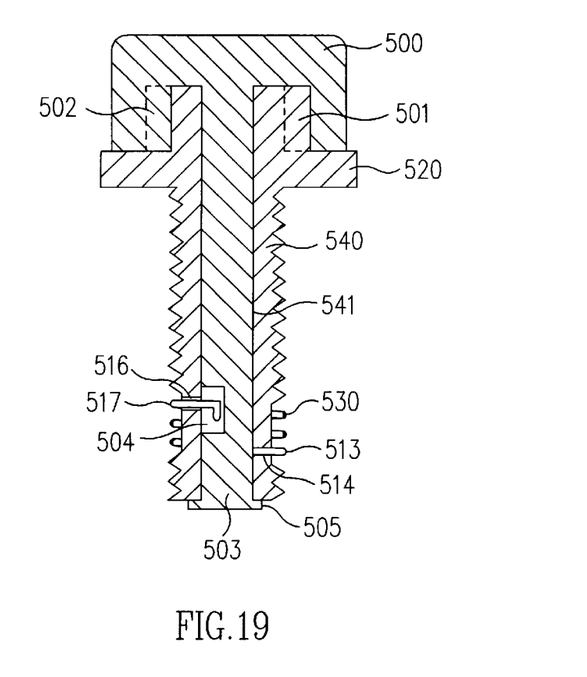
FIG. 19 is a front sectional view of the secure bolt of FIG. 18 with the parts being assembled into a single body.
Figure 20:
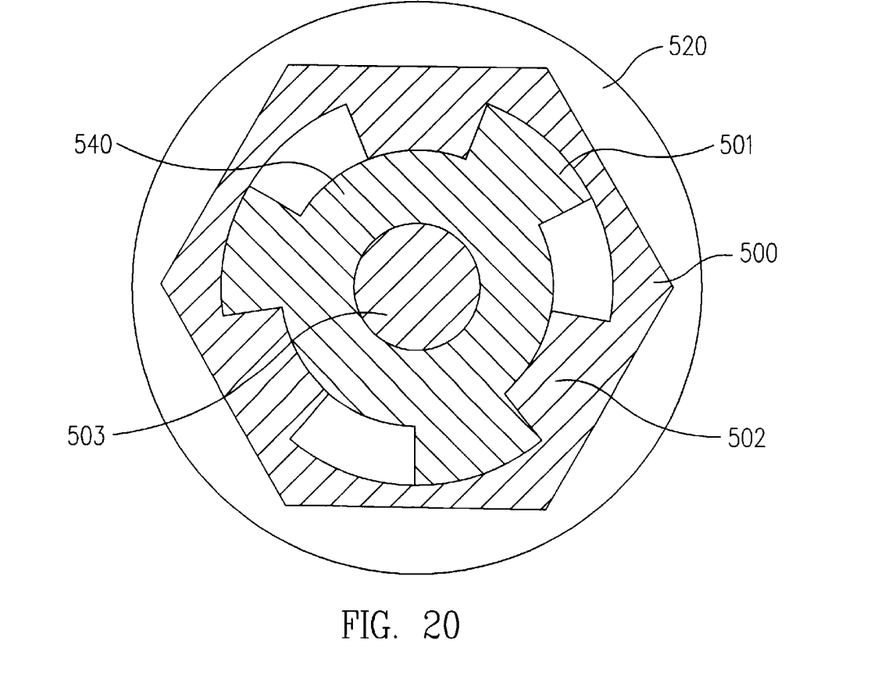
FIG. 20 is a plan sectional view of the secure bolt of FIG. 18 with the parts being assembled into a single body and shows the operational effect of a coil spring of the bolt.

FIG. 18 is an exploded perspective view of a secure bolt in accordance with the sixth embodiment of the present invention. FIG. 19 is a front sectional view of the above secure bolt with the parts being assembled into a single structure. FIG. 20 is a plan sectional view showing the operational effect of a coil spring of the above bolt. In the sixth embodiment, the bolt is longitudinally holed at the center and is provided with a plurality of splines at the top surface of the head. The bolt also engages with an actuating cap, thus being automatically changed between a secured position and a loosenable position by a rotating action of the actuating cap in either direction. That is, when the actuating cap is rotated in either direction, the movable end 517 of the coil spring 530 is moved in the same direction, thereby enlarging or reducing the diameter of the spring 530 and automatically changing the bolt 510 between the secured and movable positions.

That is, the shank 540 of the bolt 510 has an external thread 511 with a smooth section 512, thus receiving a coil spring 530 at the smooth section 512. In such a case, the fixed end 513 of the spring 530 is caught by a fixing slot 514 of the smooth section 512, while the movable end 517 of the spring 530 radially passes through a guide slit 516 of the smooth section 512.

A plurality of external splines 501 are provided at the top surface of the bolt's head 520, while a longitudinal hole 541 is formed at the center of the shank 540.

The actuating cap 500 is provided with both a plurality of internal splines 502 and a longitudinal actuating rod 503. The actuating rod 503 is received in the longitudinal hole 541 of the bolt 510 with the external and internal splines 501 and 502 engaging with each other, thus allowing the cap 500 to cooperate with the bolt 510. The above actuating rod 503 has an actuating slot 504, which receives and actuates the movable end 517 of the spring 530. The movable end 517 of the spring 530 is thus moved in accordance with a rotating action of the cap 500 and enlarges or reduces the spring's diameter, thus automatically changing the bolt 510 between the secured and movable positions.

In FIG. 19, the reference numeral 505 denotes a stop ring, which is provided at the end of the actuating rod 503 and allows the cap 500 to be rotatable relative to the bolt 510 while preventing an unexpected separation of the cap 500 from the bolt 510.

Figure 21A:
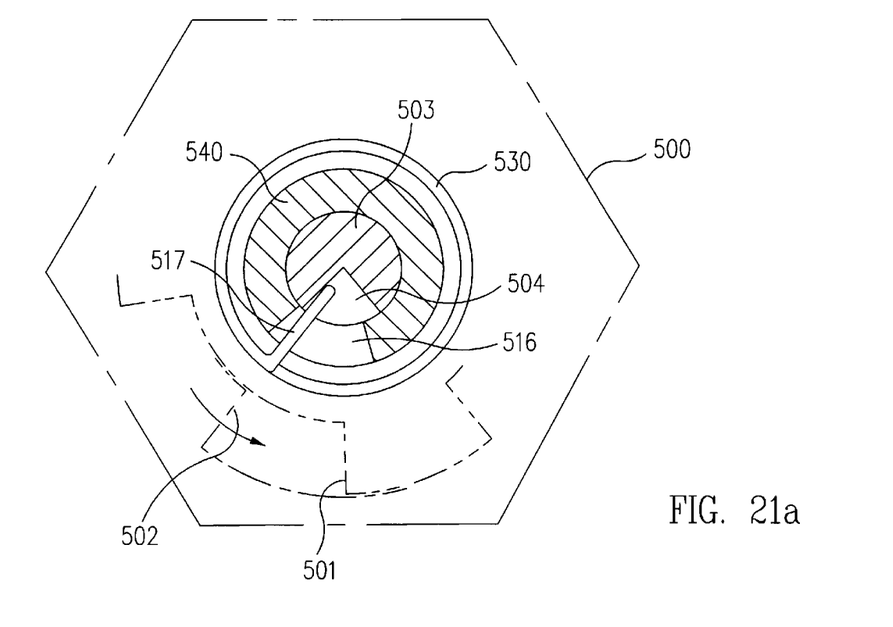
FIG. 21a shows the bolt in a secured position.

The operational effect of the above bolt 510 will be described hereinbelow with reference to FIGS. 21a and 21b. In order to screw the bolt 510 into an internally threaded hole, the actuating cap 500 is rotated in a tightening direction by a tool as shown by the arrow in FIG. 21a. In such a case, the external splines 501 of the bolt's head 520 are biased by the internal splines 502 of the cap 500.

Therefore, the bolt 510 is rotated and screwed into the internally threaded hole.

When the bolt 510 is rotated in the tightening direction as described above, the coil spring 530 of the shank 540 is brought into frictional contact with the internally threaded hole and slides in a direction from the shank's end to the head 520. In such a case, since the spring 530 is fixed to the bolt 510 at the lower end or the fixed end 513 and is movable at the upper end or the movable end 517, the number of turns of the spring 530 is increased, while the diameter of the spring 510 is reduced. Therefore, the spring 530 is not brought into contact with the internally threaded hole and allows the bolt 510 to be smoothly screwed into the hole without having any interference between the spring 530 and the internally threaded hole.

When the bolt 510 is vibrated or impacted and may unexpectedly come loose, the coil spring 530 slides in a direction from the head 520 to the shank's end while being brought into frictional contact with the internally threaded hole. In such a case, since the spring 530 is fixed to the bolt 510 at the lower end or the fixed end 513 and is movable at the upper end or the movable end 517, the diameter of the spring 530 is enlarged, thus enlarging the frictional force between the spring 530 and the threaded hole and preventing the bolt 510 from being unexpectedly loosened.

Figure 21B:
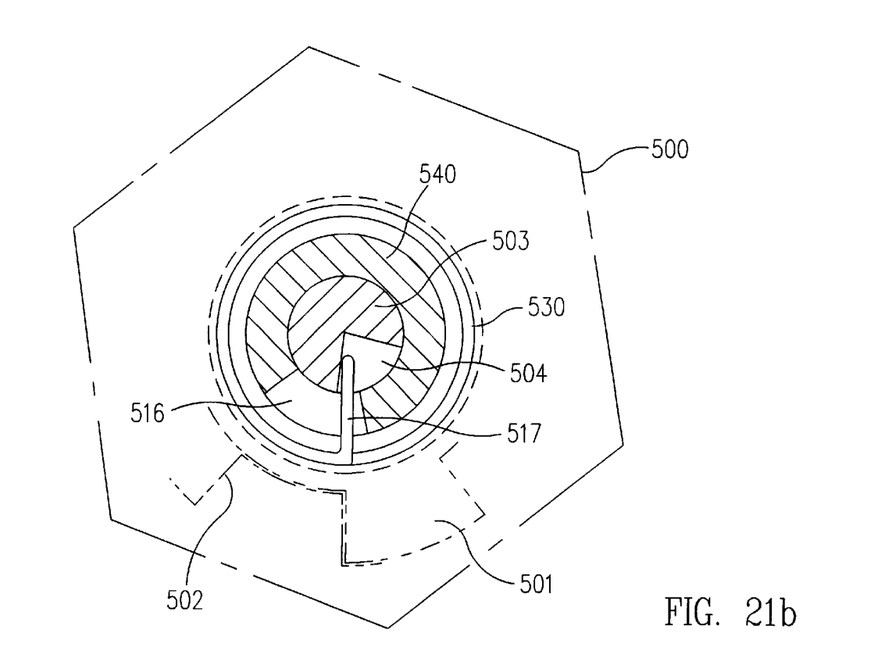
FIG. 21b shows the bolt in a loosenable position.

However, when it is necessary to loosen the bolt 510 from the threaded hole, the actuating cap 500 is rotated in an opposite direction as shown in FIG. 21b.

In such a case, the internal splines 502 of the cap 500 are rotated in the same direction. However, the external springs 501 of the bolt 510 are normally biased by the coil spring 530, thus being spaced apart from the internal splines 502 at an interval. Due to the space between the two types of splines 501 and 502, the actuating cap 500 is primarily rotated alone at an angle before the internal splines 502 come into contact with the external splines 501. During such a primary rotating action of the cap 500, the actuating rod 503 is rotated at the same angle in the longitudinal hole 541 of the bolt 510 while leading the movable end 517 of the spring 530 in the loosening direction.

When the movable end 517 of the spring 530 is moved in the loosening direction, the number of turns of the spring 530 is increased, while the diameter of the spring 510 is reduced.

Due to the reduced diameter of the spring 530, a space is formed between the spring 530 and the threaded hole and allows the bolt 510 to be rotatable in the hole. When the actuating cap 500 is further rotated in the loosening direction, the internal splines 502, coming into contact with the external splines 501 of the bolt 510, start to rotate the splines 501 in the same direction. Therefore, the bolt 510 can be smoothly loosened from the threaded hole without having any interference between the spring 530 and the threaded hole.

In a brief description, the bolt 510 according to the sixth embodiment is automatically changed between a secured position and a loosenable position by an actuating cap 500, thus being convenient to a user who wants to tighten or loosen a bolt.

As described above, the present invention provides a secure threaded fastener: a nut or bolt which is provided with a coil spring capable of preventing the fastener from unexpectedly coming loose. A threaded fastener, with the above coil spring, is preferably used for fastening separate parts of an article or structure such as a precision machine. Another advantage of the above threaded fastener resides in that it is almost completely prevented from unexpectedly coming loose, thus effectively preventing safety hazards.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A secure threaded fastener, comprising:
   a nut provided with an internally threaded hole, said internally threaded hole having a smooth section free from any internal thread, said smooth section having a diameter equal to or larger than a major diameter of said nut; and
   a coil spring radially and outwardly bent at both ends and fitted over said smooth section, with one end of the spring being caught by a fixing slot of a nut's body, thus forming a fixed end of the spring, and the other end of the spring being movably received in a guide slit of the nut's body, thus forming a movable end of the spring, wherein a hook slit is provided at the guide slit of the nut's body for selectively hooking or releasing the movable end of the spring, thus allowing the position of the nut to be selectively changed between a secured position and a loosenable position.

2. A secure threaded fastener, comprising:
   a nut provided with an internally threaded hole, said internally threaded hole having a smooth section free from any internal thread, said smooth section having a diameter equal to or larger than a major diameter of said nut;
   a coil spring radially and outwardly bent at both ends and fitted over said smooth section, with one end of the spring being caught by a fixing slot of a nut's body, thus forming a fixed end of the spring, and the other end of the spring being movably received in a guide slit of the nut's body, thus forming a movable end of the spring;
   a stop protrusion formed at the nut's body; and
   a movable hub having two types of grooves: a stop groove for the stop protrusion of the nut's body and an actuating groove movable end of the spring and being interiorly stepped at an outside edge, thus having a bushing part, said hub being fitted over the nut's body prior to fitting an end ring into the bushing part, thereby being assembled with the nut's body with a torsion spring interposed between the hub and the end ring and being rotatable in either direction so as to selectively change the position of the nut between a secured position and a loosenable position.

3. A secure threaded fastener, comprising:

a nut provided with an internally threaded hole, said internally threaded hole having a smooth section free from any internal thread, said smooth section having a diameter equal to or larger than a major diameter of said nut;

a coil spring radially and outwardly bent at both ends and fitted over said smooth section, with one end of the spring being caught by a fixing slot of a nut's body, thus forming a fixed end of the spring, and the other end of the spring being movably received in a guide slit of the nut's body, thus forming a movable end of the spring;

a plurality of external splines formed at the nut's body; and an actuating cap having a plurality of internal splines cooperating with the external splines, one of said internal splines positioned approximate to the guide slit being longitudinally notched, thereby having a groove for the movable end of the spring, said cap being fitted over the nut's body prior to fitting an end ring into one end of the actuating cap, thus being assembled with the nut's body and being rotatable in either direction so as to selectively change the position of the nut between a secured position and a loosenable position.

4. A secure threaded fastener, comprising:

a bolt comprising an externally threaded shank with a head, said shank having a smooth section free from any internal thread, said smooth section having both a fixing slot and a guide slit; and a coil spring radially and inwardly bent at both ends and fitted over said smooth section, with one end of the spring being caught by said fixing slot, thus forming a fixed end of the spring, and the other end of the spring being movably received in said guide slit, thus forming a movable end of the spring.

5. The secure threaded fastener according to claim 4, further comprising:

a plurality of external splines formed at a top surface of said head;

a longitudinal hole formed at a center of said shank; and an actuating cap provided with both a plurality of internal splines and a longitudinal actuating rod having an actuating slot, said actuating cap being assembled with the bolt, with the actuating rod being received in the longitudinal hole and the external and internal splines cooperating with each other and the actuating slot receiving the movable end of the spring, said cap thus being rotatable in either direction so as to selectively change the bolt between a secured position and a movable position.

* * * * *